(12) United States Patent
Fischer et al.

(10) Patent No.: US 11,159,071 B2
(45) Date of Patent: Oct. 26, 2021

(54) BUSBAR UNIT FOR AN ELECTRIC MOTOR

(71) Applicant: Nidec Corporation, Kyoto (JP)

(72) Inventors: Matthias Fischer, Bietigheim-Bissingen (DE); Keisuke Fukunaga, Kyoto (JP); Thomas Kuebler, Bietigheim-Bissingen (DE); Juergen Schmid, Bietigheim-Bissingen (DE)

(73) Assignee: NIDEC CORPORATION, Kyoto (JP)

( * ) Notice: Subject to any disclaimer, the term of this patent is extended or adjusted under 35 U.S.C. 154(b) by 65 days.

(21) Appl. No.: 16/344,403

(22) PCT Filed: Nov. 2, 2017

(86) PCT No.: PCT/JP2017/039712
§ 371 (c)(1),
(2) Date: Apr. 24, 2019

(87) PCT Pub. No.: WO2018/084237
PCT Pub. Date: May 11, 2018

(65) Prior Publication Data
US 2020/0052543 A1 Feb. 13, 2020

(30) Foreign Application Priority Data
Nov. 4, 2016 (DE) .......................... 102016121119.2

(51) Int. Cl.
*H02K 3/52* (2006.01)
*H01R 25/16* (2006.01)
(52) U.S. Cl.
CPC ........... *H02K 3/522* (2013.01); *H01R 25/165* (2013.01); *H02K 2203/09* (2013.01)

(58) Field of Classification Search
CPC ............. H01R 25/165; H02K 2203/09; H02K 2213/03; H02K 3/50; H02K 3/522
(Continued)

(56) References Cited

U.S. PATENT DOCUMENTS

2012/0223604 A1 9/2012 Hennecke et al.
2013/0264899 A1 10/2013 Goto et al.
(Continued)

FOREIGN PATENT DOCUMENTS

DE 10 2011 004 919 A1 9/2012
JP 2008-278704 A 11/2008
(Continued)

OTHER PUBLICATIONS

Fischer et al., "A Busbar Assembly For An Electric Motor", U.S. Appl. No. 16/820,896, filed Mar. 17, 2020.
(Continued)

*Primary Examiner* — Alex W Mok
(74) *Attorney, Agent, or Firm* — Keating & Bennett (57) ABSTRACT

A busbar unit for an electric motor may include a busbar holder at least a portion of which is made of an electrically insulating material, and at least one busbar mounted on the busbar holder. The busbar may include a base portion extending along a mounting surface of the busbar holder, at least one coil connection terminal portion to be electrically connected to a coil of the electric motor, and a power source connection terminal portion to be electrically connected to a power source. The power source connection terminal portion may extend from the base portion and at least a portion of the base portion may include a resilient member allowing displacement of the power source connection terminal portion towards the busbar holder.

21 Claims, 6 Drawing Sheets

(58) Field of Classification Search
USPC .......................................................... 310/71
See application file for complete search history.

(56) References Cited

U.S. PATENT DOCUMENTS

| | | |
|---|---|---|
| 2014/0091683 A1 | 4/2014 | Ito et al. |
| 2014/0167241 A1* | 6/2014 | Matsuoka ............... H01L 23/24 |
| | | 257/690 |
| 2014/0246934 A1* | 9/2014 | Egami ...................... H02K 3/20 |
| | | 310/71 |
| 2015/0097453 A1* | 4/2015 | Nishikawa ............... H02K 3/50 |
| | | 310/71 |
| 2015/0372554 A1* | 12/2015 | Hashimoto .............. H02K 3/50 |
| | | 310/71 |
| 2016/0013691 A1 | 1/2016 | Houzumi et al. |
| 2016/0149454 A1 | 5/2016 | Haga et al. |
| 2017/0279330 A1 | 9/2017 | Willner et al. |

FOREIGN PATENT DOCUMENTS

| | | |
|---|---|---|
| JP | 2012-223030 A | 11/2012 |
| JP | 2014-103776 A | 6/2014 |
| JP | 2015-77019 A | 4/2015 |
| JP | 2016-178774 A | 10/2016 |
| WO | WO-2016076599 A1 * | 5/2016 ............... H02K 1/12 |

OTHER PUBLICATIONS

Official Communication issued in International Patent Application No. PCT/JP2017/039712, dated Jan. 23, 2018.

* cited by examiner

BUSBAR UNIT FOR AN ELECTRIC MOTOR

CROSS REFERENCE TO RELATED APPLICATIONS

This is the U.S. national stage of application No. PCT/JP2017/039712, filed on Nov. 2, 2017, and priority under 35 U.S.C. § 119(a) and 35 U.S.C. § 365(b) is claimed from German Application No. 102016121119.2, filed Nov. 4, 2016; the entire contents of each application are incorporated herein by reference.

1. FIELD OF THE INVENTION

Various example embodiments relate generally to a busbar unit for an electric motor and to an electric motor including a busbar unit.

2. BACKGROUND

Electric motors have become essential parts in a large variety of driving systems employed, e.g., in mobile environments such as in vehicles. The operation of electric motors is usually controlled by an electronic control circuit electrically connected to the electric motor via a busbar unit. Typical electronic control circuits include a plurality of electronic components that are highly sensitive to mechanical stress that may occur during the coupling of the electronic control circuit to the busbar unit. An excessive mechanical stress exerted onto such an electronic control circuit may damage the sensitive components thereof leading to increased manufacturing costs.

SUMMARY

According to various example embodiments, busbar units for electric motors are provided.

A busbar unit according to an example embodiment of the present disclosure may include a busbar holder at least a portion of which is made of an electrically insulating material, and at least one busbar mounted on the busbar holder. The busbar may include a base portion extending along a mounting surface of the busbar holder, at least one coil connection terminal portion to be electrically connected to a coil of the electric motor, and a power source connection terminal portion to be electrically connected to a power source. The power source connection terminal portion may extend from the base portion and at least a portion of the base portion may include a resilient member to allow a displacement of the power source connection terminal portion towards the busbar holder.

The above and other elements, features, steps, characteristics and advantages of the present disclosure will become more apparent from the following detailed description of the example embodiments with reference to the attached drawings.

BRIEF DESCRIPTION OF THE DRAWINGS

In the drawings, like reference characters generally refer to the same elements or portions throughout the different views. The drawings are not necessarily to scale, emphasis instead generally being placed upon illustrating the principles of the disclosure. In the following description, various example embodiments of the disclosure are described with reference to the following drawings.

DETAILED DESCRIPTION

The following detailed description refers to the accompanying drawings that show, by way of illustration, specific details and example embodiments in which the disclosure may be practiced.

The word "exemplary" is used herein to mean "serving as an example, instance, or illustration". Any example embodiment or design described herein as "exemplary" is not necessarily to be construed as preferred or advantageous over other example embodiments or designs.

Figure 1:
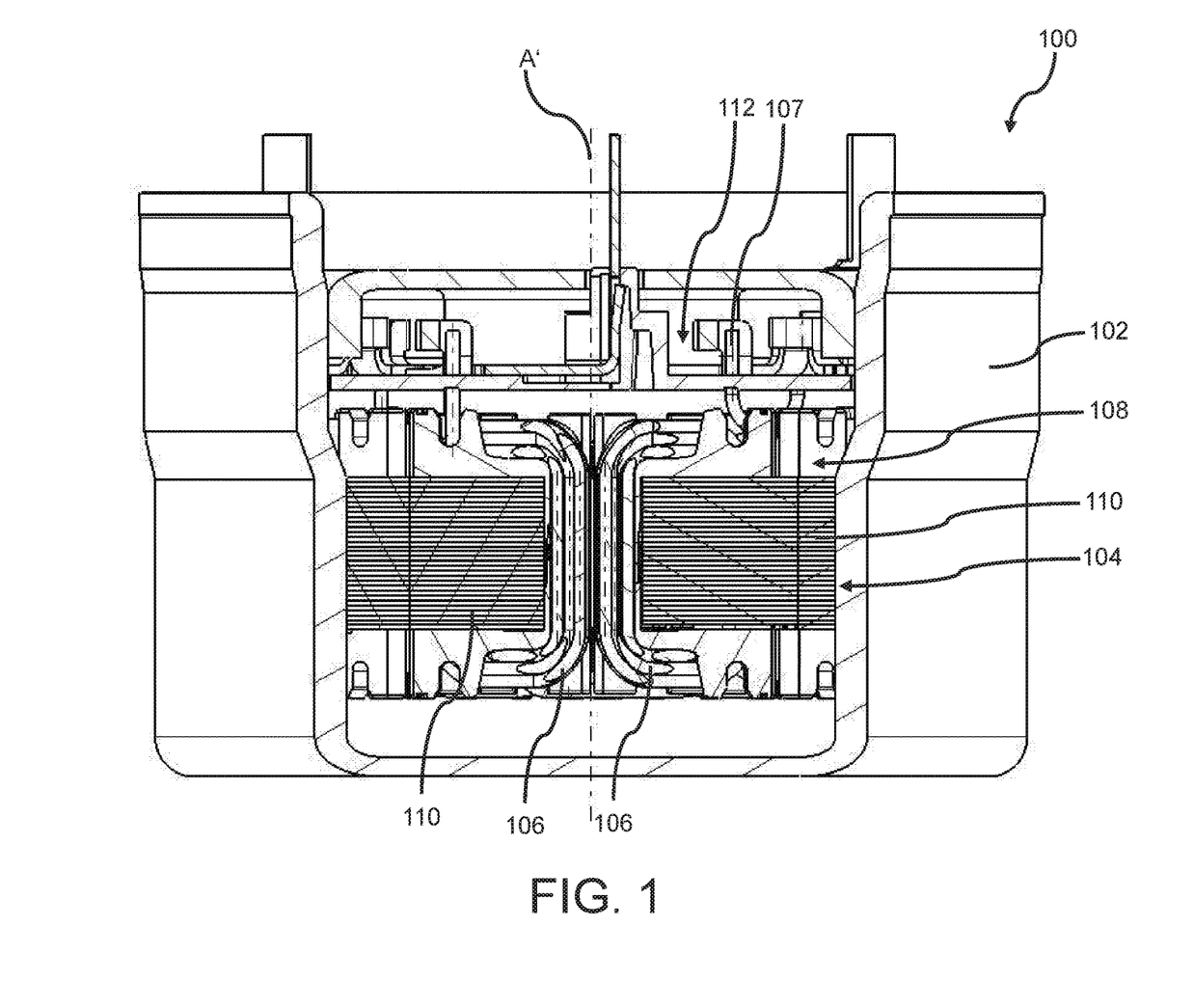
FIG. 1 shows a schematic view of an electric motor.

FIG. 1 shows a schematic view of an electric motor 100 that may be employed in a hydraulic pump configured, e.g., to convey a service liquid in a vehicle such as lubricating oil or a coolant, e.g., cooling water. The electric motor 100 may include a housing 102, and a stator 104 fixedly mounted inside of the housing 102 and configured to generate a time-varying magnetic field by means of a plurality of coils 106. The stator 104 may have a basically annular shape centered around a central axis A'.

The stator 104 may further include an insulated stator core 108 including a plurality of stator core segments 110 around which the coils 106 are respectively wound. The stator core segments 110 may be made at least in part of a ferromagnetic material such as of ferromagnetic steel. In addition, the motor 100 may include a magnetized rotor (not shown in FIG. 1) rotatably mounted inside of the housing 102 and configured to be rotated by an interaction with the time-varying magnetic field generated by the stator 104.

The motor 100 may further include a busbar unit 112 provided on an axial end side of the stator 104.

Figure 2:
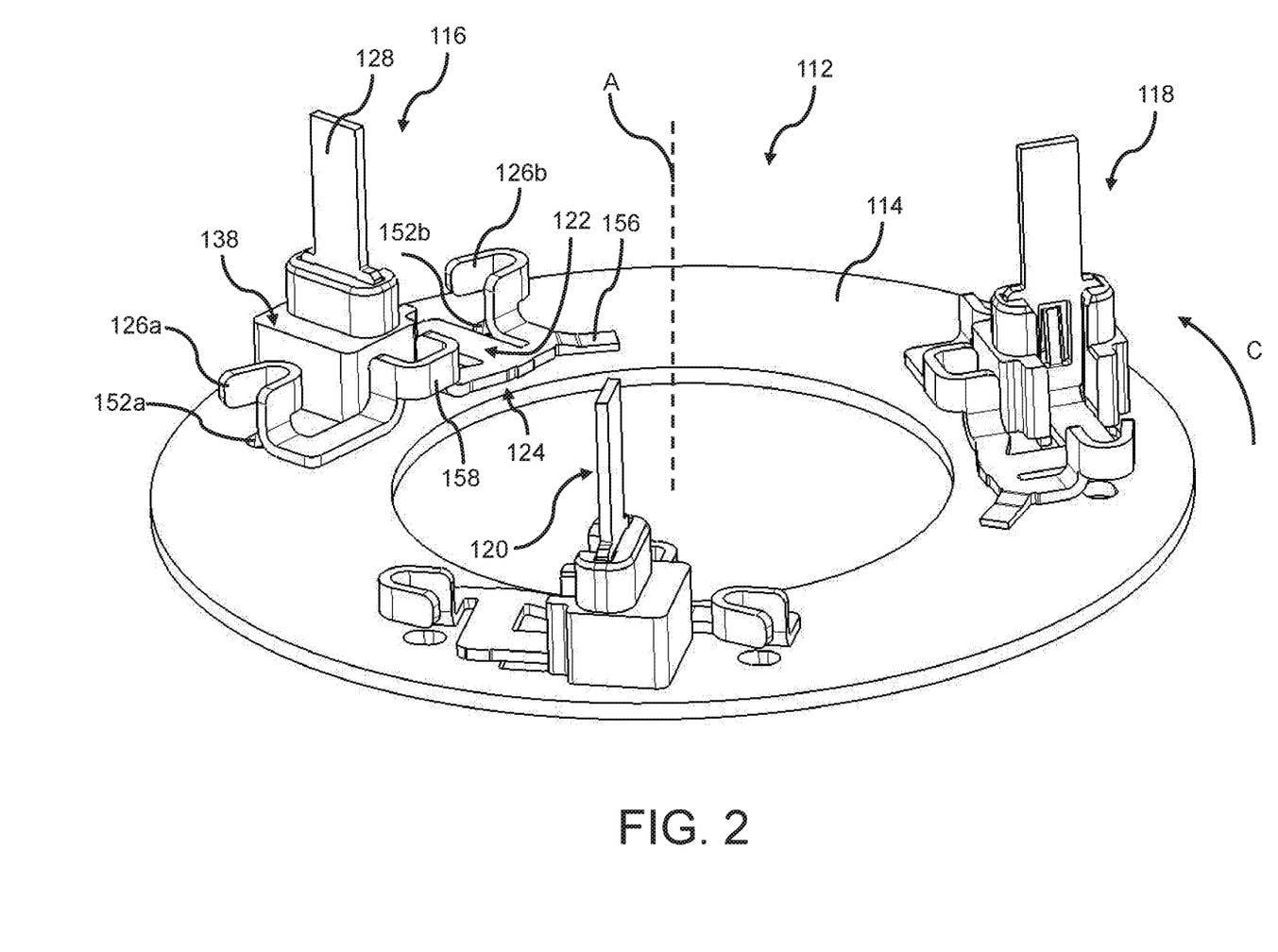
FIG. 2 shows a perspective view of a busbar unit.

A perspective view of the busbar unit 112 is shown in FIG. 2. The busbar unit 112 may include a busbar holder 114 at least a part of which is made of an electrically insulating material, and a plurality of busbars 116, 118, 120 mounted on the busbar holder 114 and made at least in part of an electrically conductive material such as copper. The electrical conductivity of the electrically insulating material of the busbar holder 114 may be less than 10-8 S/m. By means of such an electrically insulating material short circuits between the busbars 116, 118, 120 can be efficiently avoided.

The busbars 116, 118, 120 may be electrically connected to the coils 106. More specifically, end portions 107 of a winding wire forming the coils 106 may be electrically connected to respective busbars 116, 118, 120. The coils 106 may be grouped into a plurality of phase groups respectively including a plurality of coils 106 electrically connected in series. The coils 106 of a respective phase group may be electrically connected by means of respective end portions 107 of the winding wire forming the respective serially connected coils 106 to two different busbars 116, 118, 120.

The busbar holder 114 may have, as indicated in FIG. 2, a substantially annular shape centered around a central axis A and extending continuously in a circumferential direction C. The central axis A may be in the mounted state shown in FIG. 1 parallel to the central axis A' of the stator 104.

As indicated in FIG. 2, the busbars 116, 118, 120 may be positioned in the circumferential direction C of the busbar holder 114 at substantially regular angular intervals of 120°. In addition, the busbars 116, 118, 120 may be identical. Therefore, only reference will be made to one of the busbars 116, 118, 120 in the following description, e.g., to the busbar 116. The following description applies to all busbars 116, 118, 120.

Figure 3:
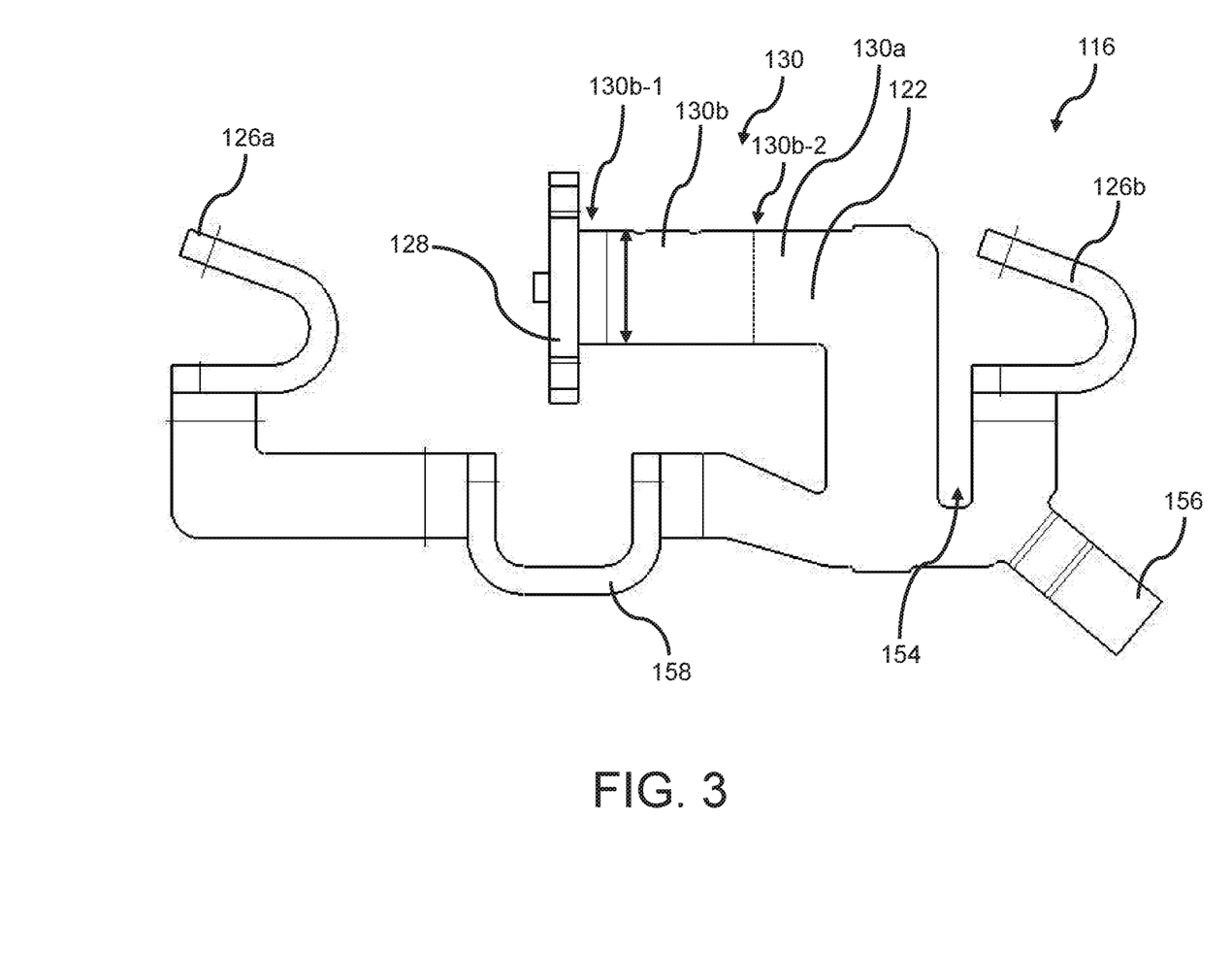
FIG. 3 shows a plan view of a busbar of the busbar unit depicted in FIG. 2.

An enlarged view of the busbar 116 is shown in FIG. 3. The busbar 116 may include a base portion 122 extending along a mounting surface 124 of the busbar holder 114, a plurality of coil connection terminal portions 126a, 126b extending from the base portion 122 and configured to be electrically connected to coils 106 of the electric motor 100, and a power source connection terminal portion 128 configured to be electrically connected to a power source (not shown in the figures). In the exemplary example embodiment shown in the figures, the busbar 116 includes two coil connection terminal portions 126a, 126b. As indicated in FIGS. 1 to 3, the power source connection terminal portion 128 may extend basically rectilinearly in a direction facing away from the busbar holder 114.

The power source connection terminal portion 128 may be connected to a power source directly or indirectly by means of an electronic control circuit that controls the electric voltage and/or current supplied to an individual coil 106 or to a group of serially connected coils 106 of the electric motor 100 to generate the time-varying magnetic field required for a rotation of the rotor. The power source connection terminal portion 128 may extend from the base portion 122 and the base portion 122 may include a resilient member 130 that is configured to allow a displacement of the power source connection terminal portion 128 towards the busbar holder 114 under the influence of a force exerted onto the power source connection terminal portion towards the busbar holder 114. The resilient member 130 may be an integral part of the base portion 122 and may be defined as that portion thereof that is deflectable under the influence of a force exerted onto the power source connection terminal portion 128 directed towards the busbar holder 114.

Due to the resiliency of the resilient member 130, the mechanical stress exerted onto an electronic control circuit during the coupling thereof to the power source connection terminal portion 128 can be reduced as compared to a power source connection terminal portion that is not configured to be displaced towards the busbar holder 114 under the influence of a force directed towards the busbar holder 114. In this way, the risk of damaging the electronic control circuit can be reduced.

In most cases, it is sufficient to allow only a small deflection of the power source connection terminal portion 128 towards the busbar holder 114 in order to avoid a damage of an electronic control circuit during the coupling thereof to the power source connection terminal portion 128. Therefore, the busbar unit 112 may include at least one stopper 132 configured to limit the displacement of the power source connection terminal portion 128 towards the busbar holder 114. The stopper 132 may be configured as a part of the mounting surface 124 to which the power source connection terminal portion 128 may be brought into physical contact when applying a force onto the power source connection terminal portion 128 towards the busbar holder 114.

Figure 6:
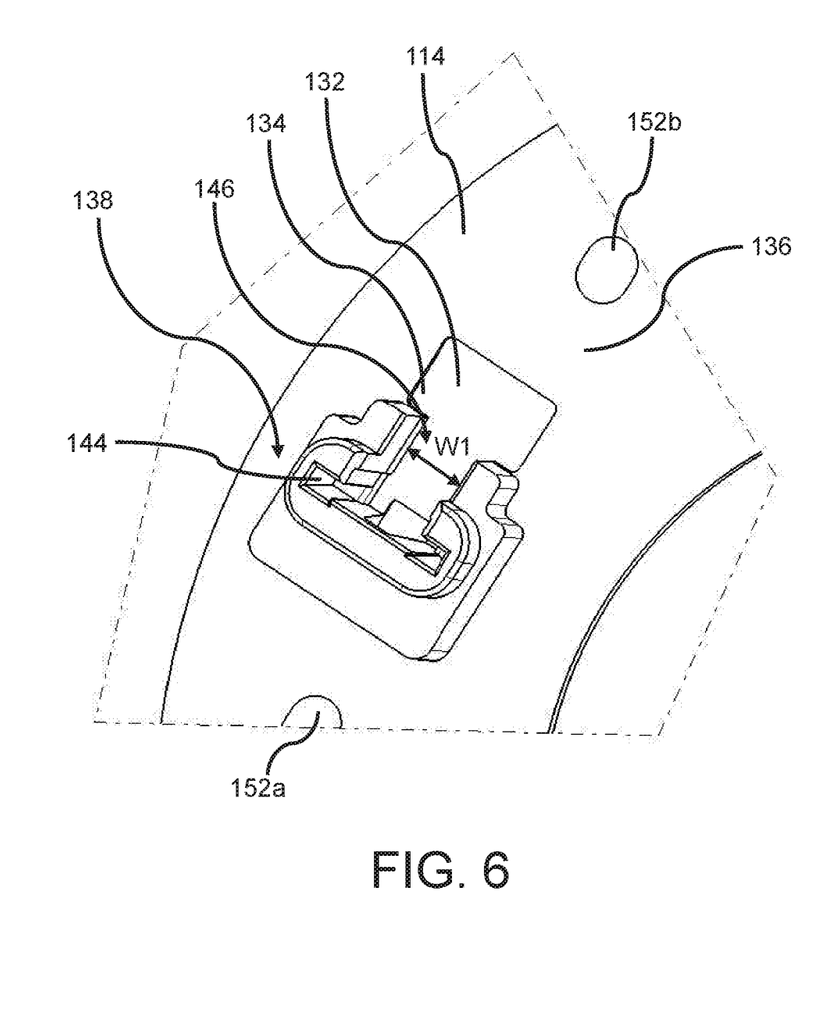
FIG. 6 shows a portion of a busbar holder of the busbar unit depicted in FIG. 2.

The part of the mounting surface 124 that may act as the stopper 132 may be configured as a recessed surface 134 shown in FIG. 6. In this configuration, the mounting surface 124 of the busbar holder 114 may include a busbar contacting surface 136 that is substantially in permanent physical contact to the busbar 116, and the recessed surface 134 that may be in physical contact to the busbar 116 only upon applying a force onto the power source connection terminal portion 128 towards the busbar holder 114.

In an example embodiment, the resilient member 130 may include a first section 130a arranged on the busbar contacting surface 136 and a second section 130b extending along the recessed surface 134 of the busbar holder 114. In this configuration, the power source connection terminal portion 128 may extend from one end 130b-1 of the second section 130b and the first section 130a may extend from an opposite end 130b-2 of the second section 130b.

The busbar 116 may be held in a defined position relative to the busbar holder 114 by means of a supporting portion 138 configured to support the busbar 116 on the busbar holder 114.

Figure 5:
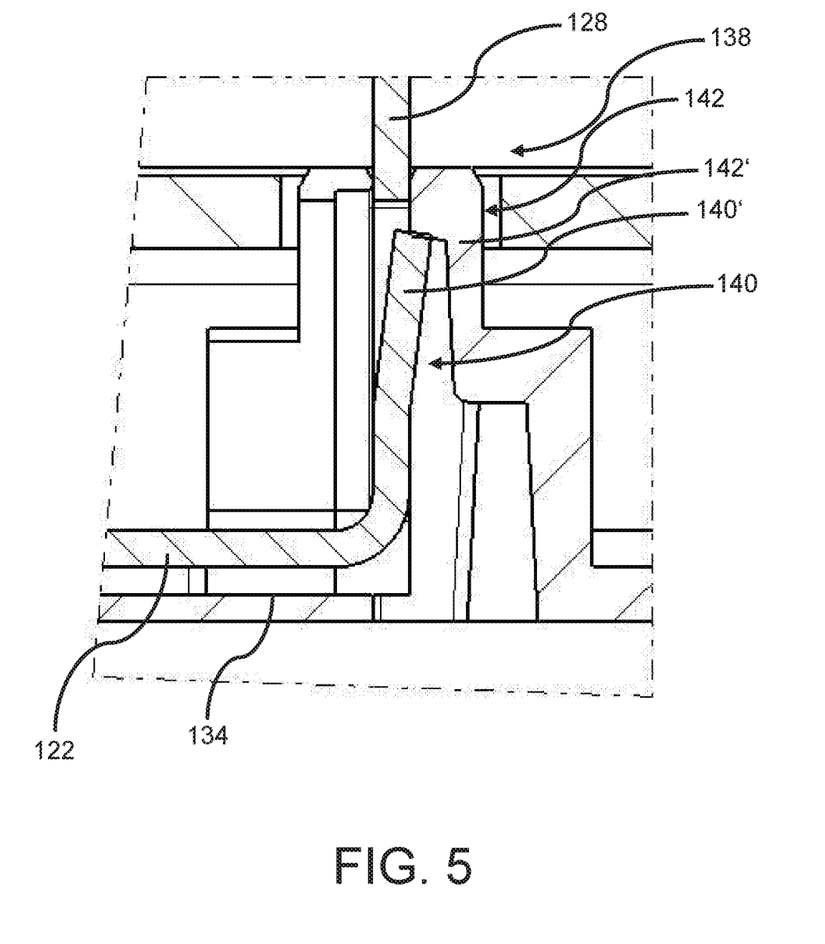
FIG. 5 is a cross-sectional view perpendicular to the one shown in FIG. 4 of a portion of the busbar unit shown in FIG. 2.

As shown in FIG. 5, the power source connection terminal portion 128 may include a stopping member 140 and the supporting portion 138 may include a contacting portion 142 for the stopping member 140 that is configured to limit a displacement of the power source connection terminal portion 128 in a direction facing away from the recessed surface 134. By means of the stopping member 140 an excessive deformation of the resilient member 130 can be avoided when disconnecting an electronic control circuit from the power source connection terminal portion 128.

As shown, e.g., in FIG. 2, the supporting portion 138 may protrude from the busbar holder 114 and may extend adjacently to the power source connection terminal portion 128. The stopping member 140 on the power source connection terminal portion 128 and the contacting portion 142 for the stopping member 140 on the supporting portion 138 may respectively include engagement members configured as protrusions 140' and 142' facing each other and configured to be brought into mutual engagement when no external force is applied onto the power source connection terminal portion 128 in a direction towards the busbar holder 114, and to be brought out of mutual engagement upon applying a force onto the power source connection terminal portion 128 in a direction towards the busbar holder 114.

Figure 4:
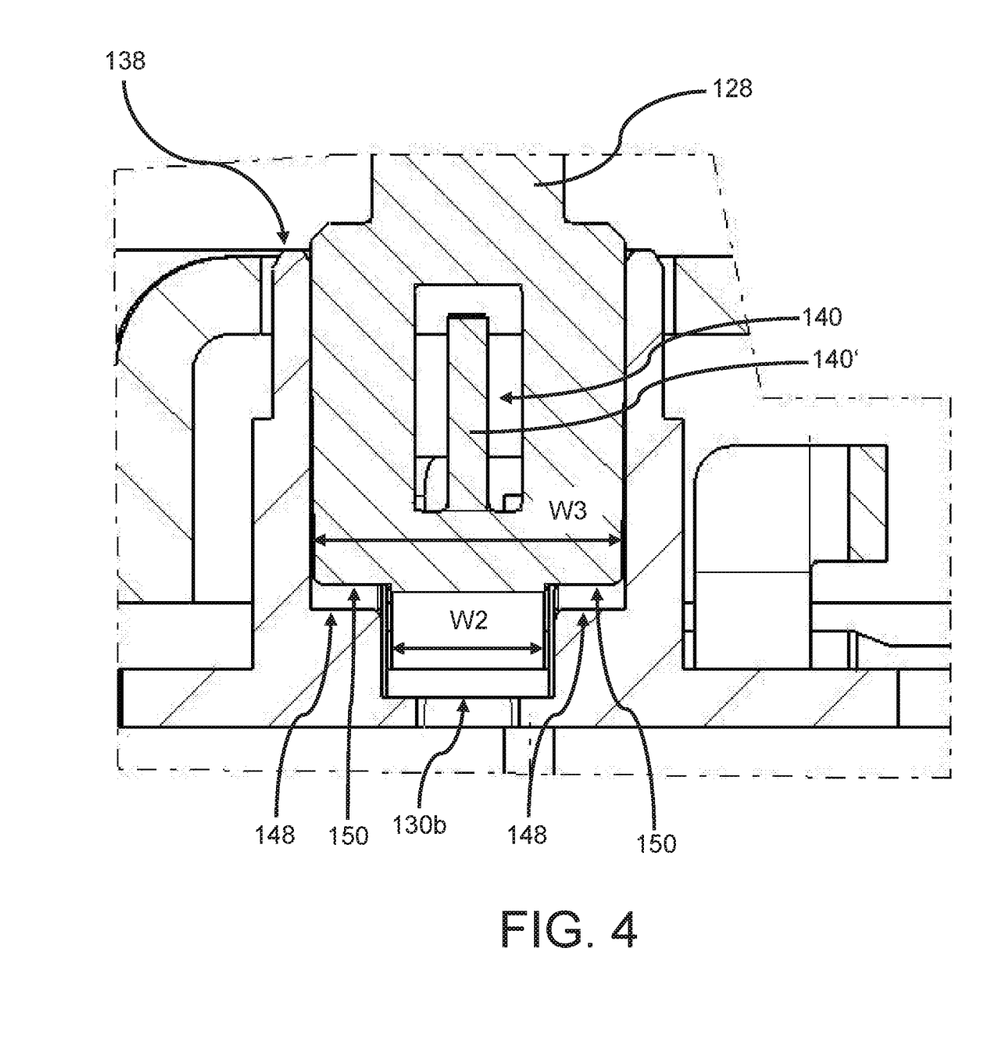
FIG. 4 is a cross-sectional view of a portion of the busbar unit shown in FIG. 2.

As indicated in FIGS. 4 and 5, the stopping member 140 may be integrally formed with the power source connection terminal portion 128, e.g., as a portion stamped out thereof. Consequently, a power source connection terminal portion 128 with a simple structure may be provided in this way.

As a portion stamped out of the power source connection terminal portion 128 the stopping member 140 may be configured as a resilient protrusion biased towards the supporting portion 138.

As indicated in the figures, the supporting portion 138 may surround at least a part of the circumference of the power source connection terminal portion 128 in order to keep the busbar 116 in a defined position on the busbar holder 114.

To keep the clearance between the power source connection terminal portion 128 and the supporting portion 138 as small as possible, the supporting portion 138 may include an inner circumference 144 complementary to an outer circumference of the part of the power source connection terminal portion 128 surrounded by the supporting portion 138. In this way, a defined position of the busbar 116 relative to the busbar holder 114 may be maintained which in turn reduces the mechanical stress exerted onto an electronic control circuit electrically connected to the busbar 116.

As indicated in FIG. 6, the supporting portion 138 may include a slot 146 having a width W1 that is larger than the width of the second section 130b of the resilient member 130. In this way, the power source connection terminal portion 128 may be attached to the supporting portion 138 by inserting the power source connection terminal portion 128 into the supporting portion 138 and by passing the second portion 130b of the resilient member 130 through the slot 146.

In case the stopping member 140 of the power source connection terminal portion 128 is configured as a resilient protrusion, it can be deflected towards the power source connection terminal portion 128 by the contacting portion 142 in the course of the above-described insertion movement and can pass by the contacting portion 142. After having passed the contacting portion 142, the stopping member 140 returns to its initial undeflected position shown in FIG. 5, i.e. it takes a position in which it inhibits a movement of the power source connection terminal portion 128 in a direction facing away from the busbar holder 114.

To efficiently inhibit a passage of the power source connection terminal portion 128 through the slot 146, at least the part of the power source connection terminal portion 128 surrounded by the supporting portion 138 may have a width W3 that is larger than the width W1 of the slot 146 and larger than the width W2 of the second portion 130b of the resilient member 130.

As indicated in FIG. 4, the supporting portion 138 may include an abutment surface 148 facing towards an end surface 150 of the power source connection terminal portion 128 and may be configured to be brought into physical contact thereto upon applying a force onto the power source connection terminal portion 128 in a direction facing towards the busbar holder 114. Consequently, the abutment surface 148 may be configured as a stopper.

As shown in FIG. 3, at least one coil connection terminal portion 126a, 126b may be configured or may include a U-shaped or V-shaped crimp connector configured to be crimped around an end portion 107 of a winding wire of a coil 106 of the stator 104. In this way, the coils 106 of the stator 104 may be electrically connected to the busbar 116 simply by mechanically deforming the respective coil connection terminal portions 126a, 126b, meaning that no additional connection means are required for the connection thereof to the end portions 107 of the winding wires. In this way, a simple overall setup may be provided.

As shown in FIGS. 2 and 6, the busbar holder 114 may include through holes 152a, 152b extending in the axial direction A of the busbar holder 114 and positioned in an overlapping relationship to the coil connection terminal portions 126a, 126b. By means of these through holes 152a, 152b, end portions 107 of winding wires of the coils 106 may be simply passed through the busbar holder 114 to electrically connect them to the respective coil connection terminal portions 126a, 126b.

The coil connection terminal portions 126a, 126b may be connected to the coils 106 of the stator 104 prior to connecting a power source or an electronic control circuit to the power source connection terminal portion 128. As discussed above, by coupling the power source connection terminal portion 128 to a power source, a force is applied onto the power source connection terminal portion 128 that leads to a deflection of the resilient member 130. Such a deflection of the resilient member 130 may have an impact on the connection between a coil connection terminal portion 126a, 126b and a respective end portion 107 of a winding wire of a coil 106 that may unintentionally increase the contact resistance therebetween. In order to mechanically decouple the resilient member 130 from at least one coil connection terminal portion 126a, 126b, the base portion 122 of the busbar 116 may be provided with a cut-out coupling portion 154 between one coil connection terminal portion 126b and the resilient member 130.

A deflection of parts of the busbar 116 different from the resilient member 130 may be additionally restricted by a protruding portion 156 extending along the mounting surface 124 in a direction facing away from the resilient member 130. The protruding portion 156 may be additionally utilized as a hot stacking means for positioning the busbar 116 on the busbar holder 114 in a defined manner.

As shown in FIG. 3, the busbar 116 may further include a resilient decoupling member 158 between the coil connection terminal portions 126a, 126b that may further contribute to a mechanical decoupling of the coil connection terminal portions 126a, 126b from each other.

The busbar 116 may be integrally formed from a continuous sheet-like material by punching a blank out of the continuous sheet-like material and subsequently bending the blank.

In the following, various example embodiments of the present disclosure will be described.

Example 1 is a busbar unit for an electric motor. The busbar unit may include a busbar holder at least a part of which is made of an electrically insulating material, and at least one busbar mounted on the busbar holder. The busbar may include a base portion extending along a mounting surface of the busbar holder, at least one coil connection terminal portion configured to be electrically connected to a coil of the electric motor, and a power source connection terminal portion configured to be electrically connected to a power source. The power source connection terminal portion may extend from the base portion and at least a part of the base portion may include a resilient member that is configured to allow a displacement of the power source connection terminal portion towards the busbar holder.

In Example 2, the subject matter of Example 1 can optionally further include at least one stopper configured to limit the displacement of the power source connection terminal portion towards the busbar holder.

In Example 3, the subject matter of any one of Examples 1 or 2 can optionally further include that the busbar holder further includes a busbar contacting surface and a recessed surface which is recessed with respect to the busbar contacting surface. The resilient member may include a first section arranged on the busbar contacting surface and a second section extending along the recessed surface of the busbar holder. The power source connection terminal portion may extend from one end of the second section and the first section may extend from the other end of the second section.

In Example 4, the subject matter of Examples 2 and 3 can optionally further include that the recessed surface of the busbar holder is configured as a stopper.

In Example 5, the subject matter of any one of Examples 1 to can optionally further include that the power source connection terminal portion extends basically rectilinearly in a direction facing away from the busbar holder.

In Example 6, the subject matter of any one of Examples 1 to 5 can optionally further include a supporting portion configured to support the at least one busbar on the busbar holder.

In Example 7, the subject matter of Example 6 can optionally further include at least one stopping member provided on the power source connection terminal portion, and a contacting portion for the stopping member on the supporting portion. The stopping member may be configured to limit a displacement of the power source connection terminal portion in a direction facing away from the recessed surface by means of the contacting portion for the stopping member.

In Example 8, the subject matter of Example 7 can optionally further include that the supporting portion protrudes from the busbar holder and extends adjacently to the power source connection terminal portion. The stopping member on the power source connection terminal portion and the contacting portion for the stopping member on the supporting portion may respectively include engagement members configured to be brought into mutual engagement when no external force is applied onto the power source connection terminal portion in a direction towards the busbar holder and to be brought out of mutual engagement upon applying a force onto the power source connection terminal portion in a direction towards the busbar holder.

In Example 9, the subject matter of Example 8 can optionally further include that the engagement members are configured as protrusions facing each other.

In Example 10, the subject matter of Example 9 can optionally further include that the stopping member is configured as a resilient protrusion biased towards the supporting portion.

In Example 11, the subject matter of Example 10 can optionally further include that the stopping member is stamped out of the power source connection terminal portion.

In Example 12, the subject matter of any one of Examples 6 to 11 can optionally further include that the supporting portion surrounds at least a part of the circumference of the power source connection terminal portion.

In Example 13, the subject matter of Example 12 can optionally further include that the supporting portion includes an inner circumference complementary to the outer circumference of the power source connection terminal portion surrounded by the supporting portion.

In Example 14, the subject matter of any one of Examples 12 to 13 can optionally further include that the supporting portion includes a slot having a width that is larger than the width of the base portion of the at least one busbar.

In Example 15, the subject matter of Example 14 can optionally further include that the width of the part of the power source connection terminal portion surrounded by the supporting portion is larger than the width of the slot.

In Example 16, the subject matter of any one of Examples 12 to 15 can optionally further include that the width of the part of the power source connection terminal portion surrounded by the supporting portion is larger than the width of the base portion.

In Example 17, the subject matter of Example 2 and of any one of Examples 6 to 16 can optionally further include that the supporting portion includes an abutment surface facing towards an end surface of the power source connection terminal portion and configured to be brought into physical contact thereto upon applying a force onto the power source connection terminal portion in a direction facing towards the busbar holder. The abutment surface may be configured as a stopper.

In Example 18, the subject matter of any one of Examples 1 to 17 can optionally further include that the at least one coil connection terminal portion includes a U-shaped or V-shaped crimp connector configured to be crimped around an end portion of a winding wire of a coil of the electric motor.

In Example 19, the subject matter of any one of Examples 1 to 18 can optionally further include that the base portion of the at least one busbar includes a cut-out coupling portion between the at least one coil connection terminal portion and the resilient member.

In Example 20, the subject matter of any one of Examples 1 to 19 can optionally further include that the busbar holder includes a through hole adjacent to the at least one coil connection terminal portion.

In Example 21, the subject matter of Example 20 can optionally further include that the at least one coil connection terminal portion and the through hole partly overlap.

In Example 22, the subject matter of any one of Examples 1 to 21 can optionally further include that the base portion of the at least one busbar includes a protruding portion extending along the mounting surface in a direction facing away from the resilient member.

In Example 23, the subject matter of any one of Example 1 to 22 can optionally further include that the at least one coil connection terminal portion extends from the base portion of the at least one busbar.

In Example 24, the subject matter of any one of Examples 1 to 23 can optionally further include a plurality of coil connection terminal portions.

In Example 25, the subject matter of Example 24 can optionally further include that the at least one busbar further includes a resilient decoupling member between two coil connection terminal portions.

In Example 26, the subject matter of any one of Examples 1 to 25 can optionally further include that the at least one busbar is integrally formed from a punched sheet material.

In Example 27, the subject matter of any one of Examples 1 to 26 can optionally further include that the busbar holder has an annular shape.

In Example 28, the subject matter of any one of Examples 1 to 27 can optionally further include a plurality of busbars.

In Example 29, the subject matter of Examples 27 and 28 can optionally further include that the busbars of the plurality of busbars are arranged in the circumferential direction of the busbar holder.

Example 30 is an electric motor that includes a busbar unit of any one of Examples 1 to 29.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A busbar unit for an electric motor, the busbar unit comprising:
a busbar holder at least a portion of which is made of an electrically insulating material; and
at least one busbar mounted on the busbar holder, the at least one busbar comprising:
a base portion extending along a mounting surface of the busbar holder;
at least one coil connection terminal portion to be electrically connected to a coil of the electric motor; and
a power source connection terminal portion to be electrically connected to a power source; wherein
the power source connection terminal portion extends from the base portion and at least a portion of the base portion includes a resilient member to allow a displacement of the power source connection terminal portion towards the busbar holder;

the resilient member is an integral element of the base portion that is deflected when an external force is applied to the power source connection terminal portion in a direction towards the busbar holder; and the mounting surface includes a recessed surface that is in physical contact with the busbar only upon applying force onto the power source connection terminal portion towards the busbar holder.

2. The busbar unit of claim 1, further comprising:

at least one stopper to limit the displacement of the power source connection terminal portion towards the busbar holder.

3. The busbar unit of claim 2, wherein a recessed surface of the busbar holder includes a stopper.

4. The busbar unit of claim 2, wherein the support includes an abutment surface defining a stopper, facing towards an end surface of the power source connection terminal portion, and capable of being brought into physical contact thereto upon applying a force onto the power source connection terminal portion in a direction facing towards the busbar holder.

5. The busbar unit of claim 1, wherein the busbar holder includes a busbar contacting surface and a recessed surface which is recessed with respect to the busbar contacting surface;

the resilient member includes a first section on the busbar contacting surface and a second section extending along the recessed surface of the busbar holder;

the power source connection terminal portion extends from a first end of the second section and the first section extends from a second end of the second section.

6. The busbar unit of claim 1, further comprising:

a support to support the at least one busbar on the busbar holder.

7. The busbar unit of claim 6, further comprising:

at least one stopper on the power source connection terminal portion; and a contact on the support to contact the stopper; wherein the stopper is located to limit a displacement of the power source connection terminal portion in a direction facing away from a recessed surface of the busbar holder via the contact.

8. The busbar unit of claim 7, wherein the support protrudes from the busbar holder and extends adjacently to the power source connection terminal portion;

the stopper and the contact respectively include engagement members to be brought into mutual engagement when no external force is applied to the power source connection terminal portion in a direction towards the busbar holder and to be brought out of mutual engagement upon applying a force onto the power source connection terminal portion in the direction towards the busbar holder.

9. The busbar unit of claim 8, wherein the engagement members are protrusions facing each other.

10. The busbar unit of claim 9, wherein the stopper is a resilient protrusion biased towards the support.

11. The busbar unit of claim 6, wherein the support surrounds at least a portion of an outer circumference of the power source connection terminal portion; and the support includes an inner circumference complementary to the outer circumference of the power source connection terminal portion surrounded by the support.

12. The busbar unit of claim 11, wherein the support includes a slot having a width that is larger than a width of the base portion of the at least one busbar.

13. The busbar unit of claim 12, wherein a width of the portion of the power source connection terminal portion surrounded by the support is larger than the width of the slot.

14. The busbar unit of claim 11, wherein the width of the portion of the power source connection terminal portion surrounded by the support is larger than the width of the base portion.

15. The busbar unit of claim 6, wherein the support includes an abutment surface defining a stopper, facing towards an end surface of the power source connection terminal portion, and capable of being brought into physical contact thereto upon applying a force onto the power source connection terminal portion in a direction facing towards the busbar holder.

16. The busbar unit of claim 1, wherein the base portion of the at least one busbar includes a cut-out coupling portion between the at least one coil connection terminal portion and the resilient member.

17. The busbar unit of claim 1, wherein the busbar holder includes a through hole adjacent to the at least one coil connection terminal portion; and the at least one coil connection terminal portion and the through hole partly overlap.

18. The busbar unit of claim 1, wherein the base portion of the at least one busbar includes a protruding portion extending along the mounting surface in a direction facing away from the resilient member.

19. The busbar unit of claim 1, further comprising:

a plurality of coil connection terminal portions; wherein the at least one busbar includes a resilient decoupler between two coil connection terminal portions.

20. The busbar unit of claim 1, wherein the busbar holder has an annular shape and includes a plurality of busbars;

the plurality of busbars are arranged in a circumferential direction of the busbar holder.

21. An electric motor, comprising the busbar unit of claim 1.

* * * * *